Patented June 24, 1941

2,246,646

UNITED STATES PATENT OFFICE 2,246,646

RECOVERY OF HALOGENS

Oliver M. Urbain and William R. Stemen, Columbus, Ohio, assignors to Charles H. Lewis, Harpster, Ohio No Drawing. Application February 23, 1939, Serial No. 258,101

8 Claims. (Cl. 23—217)

This invention relates to the recovery of halogens from solutions containing halides.

More particularly, this invention relates to the recovery of bromine and iodine from saline solutions such as sea water, deep well brines and by-product liquids from the salt industry.

Bromine and iodine occur in many liquids, but, in general, the concentration of these elements in such liquids as sea water and deep well brines is very dilute, making recovery difficult and expensive. Bromine occurs in sea water in concentrations of approximately 60.0 parts per million and less. Certain mineral waters and salt springs contain much higher concentrations of bromine. Deep well brines and liquids which are by-products of the salt industry often contain as much as 2500 ppm. of bromine, and variable quantities of iodine. For example, in the manufacture of potassium chloride from carnallite there is produced a mother-liquor containing 2500 ppm. of bromine as magnesium bromide. Iodine is also found in deep well brines in various quantities. For example, it is known that the waters from certain Russian naphtha wells contain from 15 to 200 ppm. of iodine.

In view of the large demand for bromine and iodine in such industries as the manufacture of dyes, synthetic organic chemicals, ethyl gasoline, pharmaceuticals, etc., it will be seen that the recovery of these halogens from solutions in which they are present, even though in low concentrations, is of extreme commercial importance.

Processes now in use for the recovery of these halogens from such solutions depend in general upon converting the bromides and iodides into elemental bromine and iodine by oxidation either electrolytically or chemically, expelling the elemental bromine and iodine from the large quantity of water in which it is contained; adsorbing the halogens with adsorbing agents such as activated carbons or strongly alkaline solutions; and recovering the halogens from the adsorption media in various ways.

The most convenient chemical method for oxidation of bromides and iodides to bromine and iodine has been found to be the use of elemental chlorine, which is generally passed through the saline solution containing the halides to effect oxidation. To effectively and quantitatively accomplish the oxidation of the halides contained in the saline solutions, it has been found desirable to carry out the oxidation in acid solutions, preferably those solutions having a pH of from 3.0 to 6.0. The halogens released by oxidation are swept out of the liquid by a compressed air current after which this air current is passed over or through the adsorption media.

When activated carbon is employed as the adsorption medium, the halogens adsorbed thereupon may be driven out of the carbon by steam or by external heat treatment and recovered by conventional methods.

In our copending application Serial No. 258,100 filed February 23, 1939, there is described and claimed a novel process for recovering iodine and bromine from halide containing solutions. In that process an active carbon which has been saturated with chlorine is utilized to effect release of bromine and iodine from such solutions and simultaneously to effect adsorption of elemental bromine and iodine thus released in one operation. To prepare the chlorinated carbon employed in that process, gaseous chlorine is passed over and through any of the various active carbons until the latter become saturated with adsorbed chlorine. In the preparation of such a chlorinated carbon, it has been found that an active carbon will adsorb sufficient chlorine to increase its weight by about 60%. However, it has been found that only a portion of the adsorbed chlorine is available for release and exchange with bromine and iodine, the remainder remaining fixed on the carbon. Experiments have indicated that the chlorine not available for exchange resists very severe displacement treatment such, for example, as prolonged treatment with super-heated steam. Therefore, once the material has been prepared and utilized in the invention therein described, the regeneration of the material involves substituting only the quantity of chlorine which has been actually displaced by bromine or iodine in the process.

Through the use of chlorinated carbon by the processes described in our copending application it has been found that in general approximately two units by weight of chlorine are required to exchange with one unit by weight of either bromine or iodine during the exchange process.

We have now found that an active carbon which has first been ammoniated and then chlorinated may be effectively employed to recover bromine and iodine from solutions containing halides. Chlorinated ammoniated carbon is particularly advantageous in the removal of these halogens from alkaline solutions such as those having a pH of 9.0 or over. Since sea water and most natural saline waters are distinctly alkaline, this process is admirably suited for the recovery of bromine and iodine from such waters. The process may be adapted to all waters, however, by raising the pH of those liquids not sufficiently alkaline to 9.0 or over by treatment with an alkali such, for example, as hydrated lime. The effectiveness of a chlorinated ammoniated carbon has been found to be greater when the solution being treated has a pH of not less than 9.4.

When an active carbon is first saturated with an ammoniacal gas, such for instance as gaseous ammonia or a volatile amine, and thereafter treated with gaseous chlorine, chlorine will be adsorbed in such a form as to be entirely available for exchange with either bromine or iodine. The effectiveness of an active carbon containing chlorine adsorbed in this manner has been found to be greater than an active carbon which has been treated with gaseous chlorine alone. When the latter is employed to recover bromine and iodine, approximately two units by weight of chlorine is necessary for exchange with one unit by weight of either bromine or iodine, whereas through the use of a chlorinated ammoniated carbon only approximately one and one-half units by weight of chlorine is required for one unit by weight of bromine or iodine.

The preparation of an active carbon for use in the process herein described consists of first blocking off the active carbon with gaseous ammonia or a volatile amine, followed by saturation with gaseous chlorine. Treatment of an active carbon with gaseous ammonia has been found to increase the weight of the active carbon by approximately 5%. Saturation of the ammoniated carbon, with chlorine results in an additional increase in weight of approximately 20% based upon the weight of the active carbon originally employed. The available chlorine index of a chlorinated ammoniated carbon may, therefore, be as much as 20%. A chlorinated ammoniated carbon containing less than this quantity of available chlorine will function in the process of this invention but its effectiveness is dependent upon the quantity of chlorine available for exchange.

When a solution containing either bromine or iodine or both is brought into contact with an ammoniated carbon which has been saturated with gaseous chlorine, the chlorine adsorbed thereon effects release of bromine and iodine in such solutions and exchanges its position with these elements with the resultant production of an ammoniated active carbon containing bromine and iodine held by adsorption. By means of preferential adsorption, bromine and iodine may, therefore, be recovered from solutions in which these elements are present as halides in low concentrations.

The liquid containing bromides and iodides is passed through a unit which has been charged with the chlorinated ammoniated carbon. The rate at which the liquid may be passed through such a unit has been found to be relatively immaterial. However, better efficiency is secured by passing the liquid through the chlorinated ammoniated carbon at a rate rapid enough to prevent any substantial loss of the available chlorine to a liquid from which the bromine and iodine has already been removed. After all available chlorine in a chlorinated ammoniated carbon exchange unit has been exchanged for bromine and iodine, the latter elements are recovered from the filter unit by applying heat externally to the unit or by passing super-heated steam through the unit and condensing the steam and halogen vapors by means of an ordinary condenser. The bromine and iodine may be recovered from the condensate by any conventional methods such as fractional distillation and sublimation. Any of the bromine which has become converted to hydrogen bromide in the condensate may be treated to release bromine therefrom by such conventional steps as oxidation with chlorine.

Illustrative of the operation of the herein described process, and various stages thereof are the following examples.

*Example I*

One kilogram of 60 minute 8 to 10 mesh coconut carbon was ammoniated by passing gaseous ammonia therethrough for a period of approximately two hours. When the active carbon had become completely ammoniated, as indicated by its constant weight, it was found that the original kilogram of active carbon had increased in weight to approximately 1050 grams.

This material was next saturated with gaseous chlorine until it had again reached constant weight. It was then found that approximately 200 grams of chlorine had become adsorbed by the ammoniated active carbon. The total weight of the chlorinated ammoniated carbon thus prepared was approximately 1250 grams.

*Example II*

The chlorinated ammoniated carbon prepared in Example I (1250 grams) was charged into a unit equipped with proper controls for passing liquids through the unit. There was then passed through this unit a liquid containing the same approximate concentration of solids as contained in sea water and to which has been added sufficient potassium bromide to bring the bromine concentration up to approximately 1000 parts per million. The alkalinity of this solution was adjusted to a pH of approximately 9.4. The artificial sea water thus prepared was passed through the unit at the rate of approximately 150 liters per hour. Samples of the effluent were collected as each 10 liters passed through the unit and these samples were analyzed for bromine content. No bromine was found in the samples of effluent collected from the unit until after 130 liters had passed therethrough. A sample of the effluent collected after 140 liters had passed through the unit showed a bromine content of 490 parts per million. The sample taken after 150 liters had passed through the unit showed a bromine content of 985 parts per million, as compared with the original bromine content of 1000 parts per million in the solution.

The results of this experiment are tabulated in Table I below, which additionally shows that when a chlorinated ammoniated carbon unit reaches its capacity it becomes exhausted very suddenly.

TABLE I

*Bromine remaining in effluent from treatment of liquid containing 1000 ppm. bromine with 1250 grams of chlorinated ammoniated carbon containing 200 grams of available chlorine*

| Liquid thru unit, liters | Bromine content, ppm. |
| --- | --- |
| 20 | None |
| 40 | None |
| 60 | None |
| 80 | None |
| 100 | None |
| 110 | None |
| 120 | None |
| 130 | None |
| 140 | 490 |
| 150 | 985 |

These results indicate that the particular chlorinated ammoniated coconut carbon employed in these experiments and containing 200 grams of chlorine available for exchange was effective in completely removing the bromine from approximately 135 liters of an artificial sea water containing 1000 parts per million of bromine and having a pH of approximately 9.4. The actual quantity of bromine removed was thus found by computation to equal approximately 135 grams thus indicating that approximately one and one-half units of available chlorine had been exchanged for one unit of bromine.

In order to determine the quantity of bromine effectively recovered by the chlorinated ammoniated carbon hereinbefore described, superheated steam was passed through the unit and the steam vapors thereafter condensed. The condensate was found to contain 131.5 grams of bromine. It will thus be seen that approximately 96% of bromine extracted from sea water through the use of a chlorinated ammoniated carbon filter may be recovered by the processes herein described.

*Example III*

The procedure described in Example II above was repeated using saline solutions having pH values of 1.5, 3.0 and 5.0 to determine the effectiveness of chlorinated ammoniated carbon upon acid solutions. In each of these experiments it was found that only negligible quantities of bromine were recovered from solutions in which the original bromine content was 1000 parts per million. However, when the acidity of these solutions was neutralized by the addition of hydrated lime and the pH adjusted to 9.5 results corresponding to those obtained in Example II above were obtained.

When the above experiments were repeated using solutions containing iodides instead of bromides, it was found that chlorinated ammoniated carbon prepared in accordance with the teachings of this invention was even more effective in the recovery of iodine. Approximately one and one-third parts of chlorine are required to remove one part by weight of iodine by the processes herein described. Chlorinated ammoniated carbon may also be effectively employed to recover both bromine and iodine from solutions.

Although the above examples indicate the results obtainable through the utilization of a 60 minute coconut carbon, it is to be particularly understood that various active carbons may be employed in the processes of this invention. It has been found that the available chlorine index of the various active carbons which have been ammoniated and chlorinated will vary depending upon the nature of the active carbon employed.

The advantages of a process in which bromine or iodine may be exchanged with chlorine adsorbed on an ammoniated active carbon will be apparent to those skilled in the art. Through the use of such material, it becomes unnecessary to acidify solutions which are normally alkaline such as sea water and many natural saline solutions. This is particularly advantageous in connection with the recovery of bromine and iodine from saline solutions obtained as by-products of the salt industry which are generally alkaline and which, under the prior known processes, require neutralization and acidification prior to the removal of the halogens therefrom.

Additionally, through the employment of the processes herein described, it becomes unnecessary to employ excessive quantities of chlorine to oxidize the bromine and such organic matter as is commonly contained in such saline solutions as sea water. Saline solutions containing large quantities of organic matter have been effectively treated to remove bromine and iodine therefrom with chlorinated ammoniated carbon by the process herein described, and it has been found that the presence of organic matter does not affect the efficiency of the process in any manner.

In view of the fact that when chlorinated ammoniated carbon is employed to recover bromine and iodine from saline solutions no compressed air is necessary to blow out the liberated halogens, a considerable saving is obtained over the processes of the prior art. Further additional economies are experienced due to the fact that it has been necessary under the prior known processes to completely discharge the carbon unit containing adsorbed halogens with a resulting mechanical loss in carbon of approximately 5%. By the methods herein described no mechanical loss in carbon is experienced.

By the term "ammoniated carbon," as used in the specification and claims, is meant a carbon which has been treated with ammonia or ammonia derivatives such as an amine.

It is to be expressly understood that the foregoing description is exemplary only and that the scope of this invention is not to be limited thereby beyond the scope of the subjoined claims.

Having thus described our invention, what we claim is:

1. The process of extracting bromine and iodine from liquids containing said halogens which comprises making said liquids alkaline and contacting said liquids with an active carbon which has been first saturated with an ammoniacal gas and then saturated with chlorine.

2. The process of recovering bromine and iodine from solutions containing said halogens which comprises making said solutions alkaline and contacting said solutions with an ammoniated carbon saturated with adsorbed chlorine.

3. The process of recovering bromine and iodine from solutions containing said halogens which comprises making said solutions alkaline and effecting exchange between said halogens and chlorine adsorbed on an ammoniated active carbon.

4. The process of recovering bromine and iodine from solutions containing said halogens which comprises making said solutions alkaline and effecting preferential adsorption of said halogens by means of an active carbon which has been first saturated with an ammoniacal gas and then saturated with chlorine.

5. The process of recovering bromine and iodine from solutions containing said halogens which comprises making said solutions alkaline and thereafter simultaneously effecting release and adsorption of said halogens by means of an ammoniated carbon saturated with adsorbed chlorine.

6. The process of recovering bromine and iodine from solutions containing said halogens which comprises making said solutions alkaline and thereafter contacting said solutions with ammoniated active carbon containing adsorbed chlorine available for release of and exchange with said bromine and iodine of said solutions.

7. The process of recovering bromine and iodine from solutions containing said halogens which comprises making said solutions alkaline and thereafter simultaneously effecting conversion of said halides to elemental halogens and adsorbing said halogens by means of an ammoniated carbon saturated with adsorbed chlorine.

8. The process of recovering bromine and iodine from solutions containing said halogens which comprises making said solutions alkaline and thereafter effecting exchange between said halogens and chlorine adsorbed on an ammoniated active carbon, obtaining said bromine and iodine by expelling the same from said ammoniated active carbon, and regenerating said ammoniated active carbon by saturating the same with gaseous chlorine.

OLIVER M. URBAIN.
WILLIAM R. STEMEN.